(12) United States Patent
Reigneau et al.

(10) Patent No.: US 8,810,515 B2
(45) Date of Patent: Aug. 19, 2014

(54) OPTICAL INPUT USING INTERNAL REFLECTION SURFACES

(75) Inventors: Mathieu Reigneau, Amilly (FR); Ewan Findlay, Clackmannanshire (GB); Stuart Brodie, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 498 days.

(21) Appl. No.: 12/786,126

(22) Filed: May 24, 2010

(65) Prior Publication Data

US 2010/0302160 A1     Dec. 2, 2010

(30) Foreign Application Priority Data

May 26, 2009  (GB) .................................. 0908899.8
Jul. 27, 2009  (GB) .................................. 0913000.6

(51) Int. Cl.
*G06F 3/033*  (2013.01)

(52) U.S. Cl.
USPC .......................................................... 345/166

(58) Field of Classification Search
CPC ... G06F 3/0317; G06F 3/03543; G06F 3/038; G06F 3/0304
USPC ............. 345/156, 157, 166; 356/71; 359/823; 250/221
See application file for complete search history.

(56) References Cited

U.S. PATENT DOCUMENTS

| | | | |
|---|---|---|---|
| 5,528,355 A | 6/1996 | Maase et al. | |
| 5,751,668 A | 5/1998 | Eray | |
| 5,781,651 A * | 7/1998 | Hsiao et al. | 382/127 |
| 6,061,177 A | 5/2000 | Fujimoto | |
| 6,087,953 A | 7/2000 | DeLine et al. | |
| 7,164,411 B2 * | 1/2007 | Keranen et al. | 345/156 |
| 2001/0050765 A1 | 12/2001 | Antonelli et al. | |
| 2002/0135565 A1 | 9/2002 | Gordon et al. | |
| 2002/0155857 A1 | 10/2002 | Nishimoto | |
| 2002/0167489 A1 | 11/2002 | Davis | |
| 2004/0084610 A1 | 5/2004 | Leong et al. | |
| 2004/0119668 A1 * | 6/2004 | Homma et al. | 345/82 |
| 2004/0164953 A1 * | 8/2004 | Keranen et al. | 345/156 |

(Continued)

FOREIGN PATENT DOCUMENTS

| EP | 0617919 A2 | 10/1994 |
|---|---|---|
| EP | 1073005 A1 | 1/2001 |

(Continued)

OTHER PUBLICATIONS

EPO Search Report, mailed Mar. 8, 2011, for EP10150764.8 (EP2,256,600) (9 pages).

(Continued)

*Primary Examiner* — Chanh Nguyen
*Assistant Examiner* — Jonathan Blancha
(74) *Attorney, Agent, or Firm* — Gardere Wynne Sewell LLP

(57) ABSTRACT

An optical navigation device for a computer application includes a radiation source capable of producing a beam of radiation, a sensor for receiving an image, and an optical element for identifying movement of the feature to thereby enable a computer action to be carried out. The optical element is formed from a single piece and includes at least one frustrated total internal reflection (F-TIR) surface capable of affecting frustrated total internal reflection of the beam of radiation in the presence of the feature to thereby generate the image.

32 Claims, 5 Drawing Sheets

(56) References Cited

U.S. PATENT DOCUMENTS

| | | |
|---|---|---|
| 2004/0208346 A1 | 10/2004 | Baharav et al. |
| 2006/0007148 A1 | 1/2006 | Theytaz et al. |
| 2006/0114237 A1 | 6/2006 | Crockett et al. |
| 2006/0256086 A1 | 11/2006 | Xie et al. |
| 2007/0131946 A1 | 6/2007 | Spurlock et al. |
| 2007/0152966 A1 | 7/2007 | Krah et al. |
| 2007/0152985 A1 | 7/2007 | Ostergaard et al. |
| 2007/0199804 A1 | 8/2007 | Joseph et al. |
| 2008/0029691 A1 | 2/2008 | Han |
| 2008/0170927 A1 | 7/2008 | Boraas |
| 2008/0231600 A1 | 9/2008 | Smith |
| 2008/0284925 A1 | 11/2008 | Han |
| 2009/0128499 A1 | 5/2009 | Izadi et al. |
| 2009/0279403 A1* | 11/2009 | Nishiwaki et al. ......... 369/53.12 |

FOREIGN PATENT DOCUMENTS

| | | |
|---|---|---|
| EP | 1271395 A1 | 1/2003 |
| EP | 1437677 A1 | 7/2004 |
| WO | WO-2006080601 A1 | 8/2006 |

OTHER PUBLICATIONS

UK Search Report, GB0913000.6, Nov. 23, 2009.

* cited by examiner

_US 8,810,515 B2_

OPTICAL INPUT USING INTERNAL REFLECTION SURFACES

PRIORITY CLAIM

The present invention claims priority from British Patent Application No. 0908899.8 filed May 26, 2009 and British Patent Application No. 0913000.6 filed Jul. 27, 2009, the disclosures of which are hereby incorporated by reference.

BACKGROUND

1. Technical Field

The present invention relates to improvements in or relating to optical navigation devices, particularly but not exclusively in respect to miniature devices for use in a variety of different applications.

2. Description of Related Art

Current mobile or computer devices use a variety of different navigation mechanisms. Touch screen panels are navigated by means of direct contact with screen. Other devices make use of trackball devices where a mechanical signal is translated into position data to enable the navigation to occur. A further navigation device makes use of a multi-click joystick to enable the necessary navigation. There are problems associated with each of the currently available navigation mechanisms. The touch screen panel has been shown to be somewhat unreliable while the trackball and joystick may also be unreliable as well as relatively expensive to implement.

For larger scale computer devices optical mice have been used for some time for navigation purposes. These devices are generally too large and impractical for mobile applications due to ergonomic and economic issues. In addition, miniaturization of typical optical mice has not proved successful to date.

There is a need to overcome at least some of the problems associated with the prior art.

There is further a need to apply optical mouse technology to the mobile computer domain.

SUMMARY

According to one aspect there is provided an optical navigation device for a computer application, comprising: a radiation source capable of producing a beam of radiation; a sensor for receiving an image; an optical element for identifying movement of a feature to thereby enable a control action to be carried out; wherein the optical element is formed from a single piece construction and includes at least one frustrated total internal reflection (F-TIR) surface capable of causing frustrated total internal reflection of the beam of radiation in the presence of the feature to thereby generate the image which is capable of being translated into said control action.

In a further aspect there is provided computer device, or a mobile telephone comprising the optical navigation device herein described, wherein the term "computer device" is to be construed as including at least: mobile telephones, mobile media players, such as MP3 players, TV/DVD remote control, SatNav systems, digital cameras etc.

BRIEF DESCRIPTION OF THE DRAWINGS

Reference will now be made, by way of example, to the accompanying drawings, in which.

DETAILED DESCRIPTION OF THE DRAWINGS

An optical navigation device module is presented for use in a device. The device may be of any appropriate type and may include mobile phones, PDAs, Laptop computers, TV remotes, games controls and other such devices herein referred to as a computer application.

Figure 1:
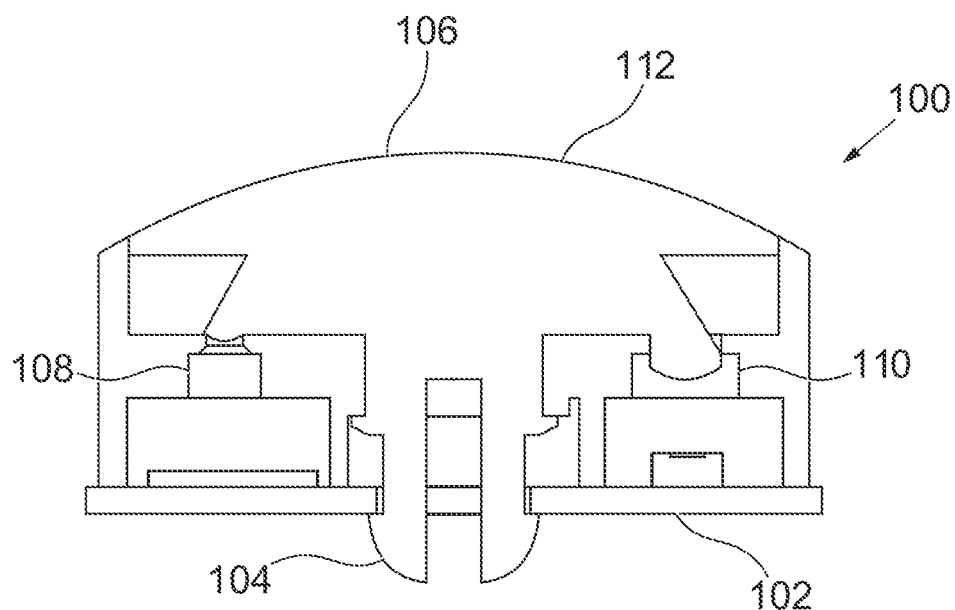
FIG. 1 is a cross-sectional diagram of an improved optical navigation device, in accordance with an embodiment, given by way of example.

Referring to FIG. 1, an optical navigation device module 100 is shown. The optical navigation device module 100 includes a base plate 102, an optical element 106 which incorporates a clip 104 (the optical element will be described in greater detail below), an illumination source 108, such as an LED, and a sensor 110. The clip 104 makes a snap fit connection with the base plate 102. The nature of the mechanical engagement is discussed in greater detail in United Kingdom Patent Application No. 0908900.4 of 26 May 2009, the disclosure of which is incorporated by reference. The overall construction of the optical navigation device module 100 is of a low profile construction making it suitable for mobile devices. The actual size of the overall package containing the optical navigation device sits under a cap of about 7 mm in diameter and the module itself has a maximum dimension of about 5.8 mm.

The optical element 106 may be molded from a single piece of plastic and provides a so called mousing surface 112. An example of the type of plastic material is a monolithic optical block made of a plastics material such as poly (methyl methacrylate) also known as PMMA; although it will be appreciated other materials (such as Polycarbonate, Cyclcyclophane copolymer) may alternatively be used.

The optical navigation device module 100 is essentially split into three main functions or components: an optical interface to the mousing surface 112; the adaptation of the optical elements to provide additional advantages in terms of mechanical construction; and the interface of the mouse or optical navigation device with the user. The specific optical design maximizes the accuracy of the navigation process in a low profile package. The optics also enable the mechanical advantages that are described in the United Kingdom Patent Application No. 0908900.4 of 26 May 2009.

Figure 2:
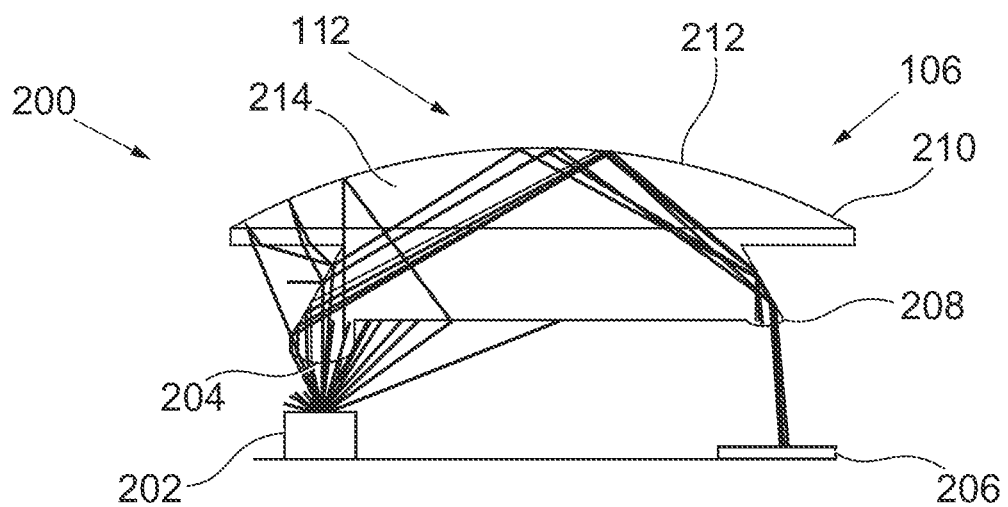
FIG. 2 is an optical diagram of the FIG. 1 device, in accordance with an embodiment, given by way of example.

Referring now to FIG. 2, an embodiment of the optical system can be seen in more detail. This embodiment shows the optical layout for a frustrated total internal reflection (F-TIR) device 200, although direct imaging systems and other systems are equally applicable to be used in place of the F-TIR device 200.

The F-TIR device 200 includes an LED 202 which emits a source of radiation directed by optical element 204 to the internal surface 210 of the mousing surface 112. A further optical element 208 then directs any reflected radiation from surface 210 on to sensor 206.

The LED 202 may be of any appropriate type and may be mounted on a substrate. In a particular example the LED emits in the near infrared range for example between about 700 to 900 nm. It should be noted that the radiation emitted by the LED may be any appropriate wavelength. If the radiation is in the UV, optical or IR ranges the radiation may be referred to as illumination.

Figure 7A:
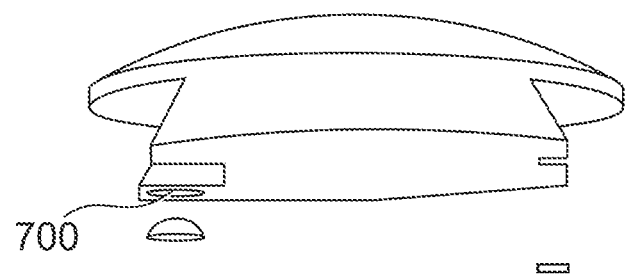
Figure 7B:
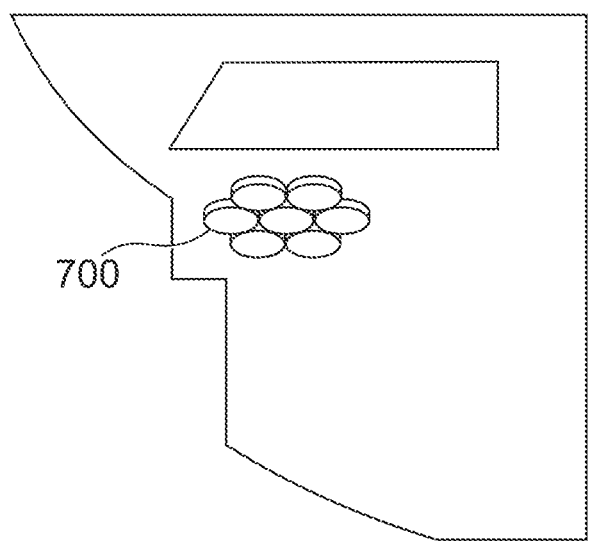

The optical element 204 directs the LED illumination into the monolithic optical block which forms the optical element 106. The optical element 204 may be shaped as appropriate to form for example a single convex surface; a series of lenslets configured as a "fly eye" structure; or any other suitable structure capable of providing near collimated or near focused illumination at the internal surface 210. The optical element 204 may be capable of being tilted in order to control the illumination pattern and direction of the beam at the mousing surface. Since optical element 204 is part of an illumination system the use of a single tilted surface can be extended to a multiple lenslet system (also known as a "fly-eye lens"), where the individual lenslets can be tilted to improve control of the illumination pattern at the mousing surface 112. A fly-eye lens is shown in FIGS. 7a and 7b and is formed from a number of lenslets 700, which replace optical element 204. The fly-eye lens allows for a more compact design as well as the improved illumination distribution. The fly-eye lens is particularly useful in the case where the radiation source 202 is an LED giving an incoherent, wide angle pseudo-Gaussian intensity pattern. It will be appreciated that different forms of fly-eye lens may be used, for example different numbers of controllable lenslets and different orientations of the lenslets.

The mousing surface 112 includes an internal surface 210 and an external surface 212. At the mousing surface any object with a refractive index which is placed in contact with the external surface 212 will frustrate the total internal reflection of the beams 214 at the internal surface 210. A suitable object may include a finger, pointer, hand or other object or feature. A so-called frustrated reflection will thus be generated and the resulting pattern is focused by optical element 208 onto the sensor 206.

The internal surface 210 is relatively smooth when compared to the features which give rise to the F-TIR. Illumination reflected from the internal surface 210 when there is no object close to the mousing surface is virtually 100% reflected. However, when the reflection is frustrated only about 10% or less of the illumination is reflected, thus resulting in contrast ratio of about 1:10 in the present example. Note that at 850 nm most of returned signal is from scattering at the object in contact with the optical element 106 (e.g. the skin of the user's finger).

The optical element 208 may be of any appropriate form, for example a single convex surface; and includes a stop (not shown) so that an image of F-TIR surface is produced at the sensor.

Ideally the optical stop on 208 is such that its numerical aperture matches that of the rest of the system. The numerical aperture of the system can be dictated by several means. Firstly it can be generated by surface texture on the mousing surface 112 being such that it scatters the incident collimated radiation into a given angular profile. In this case the optical element 208 focuses the radiation from mousing surface 112 onto the sensor 206. Also the stop can be generated by having a similar texture to any of the other surfaces intervening between the LED source 202 and lens 208, including the LED transparent package surface. In these cases, the lens 208 focuses the light from the mousing surface 112 onto the sensor 206 and the F-TIR pattern is seen as a occlusion to the true image. The LED 202 may be replaced by an extended light source, such as an organic light emitter, which on viewing from the sensor 206 subtends the sensor area. In this case the surface of the light source is imaged at the sensor 206 by way of the lens 208. Alternatively the aperture end of the collimating lens 204 may be extended to allow all imaged points of the mousing surface 112 to be subject to radiation at all angles presented to the collimating lens 204 by the extended source. This allows the lens 208 to image the mousing surface 112 onto the sensor 206.

The sensor 206 may be any appropriate type and is designed to be of maximum size within the constraints of the package. In one embodiment the sensor is made up of an array of (20×20) 30 µm pixels. Other sizes and resolutions of sensor or pixels may be used instead.

The frustrated reflection directed on to the sensor is detected in order to identify the point or points of contact of the object in contact with the external surface 212. Subsequent measurements of the point or points of contact will provide information corresponding to the movement of object on the external surface 212. The action or movement of the object can then be translated into actions to operate a mobile personal computer.

The system works at a frame rate of 1 to 10 kHz in order to detect relative movement or movements of one or more features at the F-TIR. The features detected at the F-TIR are features between about 0.5 mm and 30 µm in size and correspond, for example, to finger print features of a user. The smaller features provide a greater ability to detect motion than the larger ones. To detect features of about 30 µm, an increased resolution of the sensor and an increased quality of the optics used in the F-TIR device 200 can be advantageous. The sensor operates to determine motion vectors of one or more features from one frame to the next in accordance with the frame rate. Correlation from one frame to the next identifies the motion vectors and rate of movement which can then be translated into an appropriate control action for the mobile computer.

The frame rate is set by the refresh rate of the sensor. The exposure may be achieved by a pulsating illumination source (LED) or by sampling the sensor output at the required rate.

It may be possible to calibrate the sensor by determining the sensor illumination when there is no radiation source for F-TIR and comparing this with the sensor, when detecting F-TIR. This calibration may occur at the start of each use of the optical navigation device or on a frame to frame basis.

Figure 3:
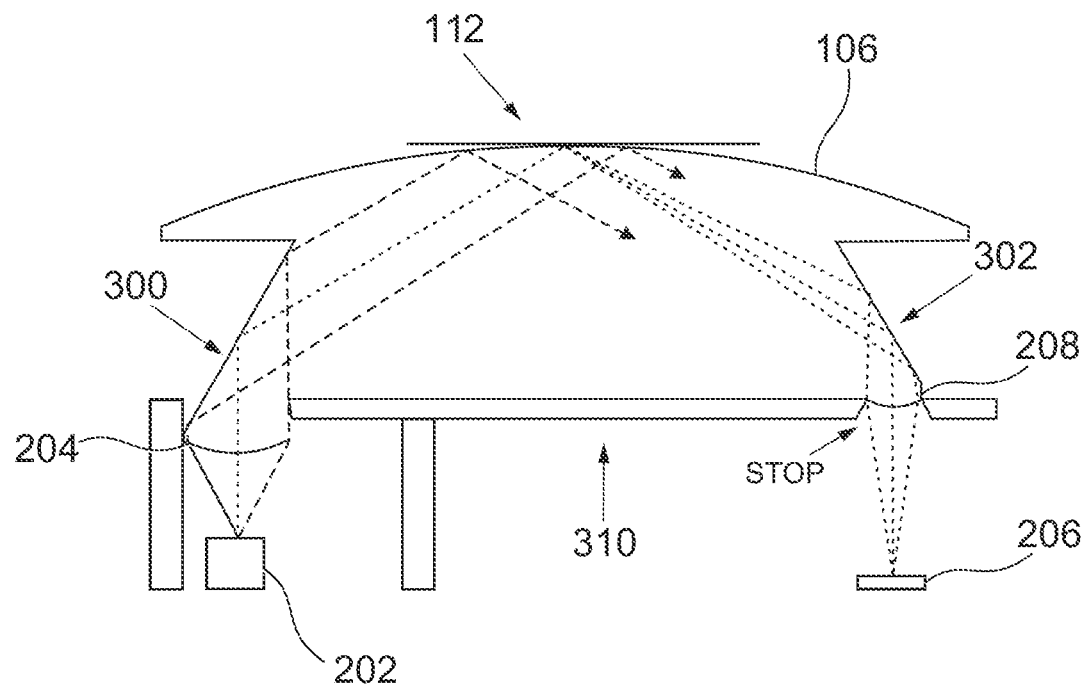
FIG. 3 is an optical diagram of an example of an embodiment of the FIG. 2 mousing surface, in accordance with an embodiment, given by way of example.

FIG. 3 shows a ray diagram to illustrate the passage of beams of illumination within the optical navigation device. The optic element 106 includes certain surfaces 300 and 302 which are total internal reflection (TIR) folded surfaces. Surface 300 reflects illumination from the LED light source 202 to the frustrated total internal reflection (F-TIR) mousing surface 112 where a frustrated total internal reflection occurs. The beam generated by the frustrated total internal reflection is then reflected on TIR fold surface 302 onto the mouse sensor 206.

The relative positions and angles between the TIR surfaces and the F-TIR mousing surface are shown in FIG. 3 to be at approximately 60° to the direction of travel of the light. However, it will be appreciated other orientations of the various surfaces may alternatively be used and may also have an impact on the overall size of the package. The precise orientation and size of the overall mouse device can be adjusted by changing the geometry and shapes of the various surfaces. For example in the diagram the mousing surface forms part of the dome of low curvature. However, a flat surface may replace the domed surface that is shown. Also the TIR surfaces (300 and 302) may be gently curved to augment the focusing of the lenses within the system. The surfaces may be adjusted to allow the use of a high angle of incidence for the main beam which allows a greater angular spread of radiation to be handled. In addition this ensures that a greater intensity of radiation is delivered to the F-TIR surface which maximizes the level of the radiation on the F-TIR surface within the constraints of size of the overall package. This is important to ensure adequate responsiveness and reaction time within the optical navigation device. As an alternative, if the TIR surfaces are at 45°, the amount of radiation on the F-TIR will be suboptimal. Accordingly, the range of angles for the TIR surfaces should be in the range 50° and 80°. In the example shown in FIG. 3 the arrangement provides a distance from the base to the F-TIR surface in the region of 3.5 mm and a distance between the two TIR folding surfaces in the region of 5.8 mm, thus giving rise to a compact package.

As previously indicated, the angles and positions of the folding TIR and F-TIR surfaces can be adjusted. One such adjustment is to replace TIR fold surface 300 with a biconic surface and adjust the angle of incidence to optimize the irradiance at the F-TIR surface. This can serve to reduce the overall size of the package containing the optical navigation device.

The system magnification for the optical navigation device is in the region of −1 to −0.1; although a preferred value is in the range −0.8 to −0.3.

FIG. 3 also shows details of the black plastic housing 310 utilized in the device to provide the entrance and exit apertures for the LED and the sensor to the optical element 106. Other housings, for example a housing with a roughened surface which might allow backlighting features, can also be used in the device.

It should be noted that ensuring that the main beam from the LED arrives at the "pupil" is not necessarily optimal. The lens apex of optical devices 204 can be off-set from the centre of the stop and the sensor off-set from the center of the lens to ameliorate the effects of the variation in object distance (e.g. tombstone distortion). The centre of the image does not necessarily need to coincide with the main beam from the LED.

A further embodiment (not shown) may be implemented using a double bounce orientation. The double bounce is used to bring the mousing surface closer to being parallel to the imaging surface thus improving the resolution and reducing the distortion of the image on which mousing is preformed. To control the illumination intensity and directional distribution at the mousing surface (as can be seen in FIG. 2) the optical device 204 can be tilted and the individual elements in the "fly eye" structure can be individually tilted. This arrangement can be realized in any plastic material at any wavelength where the silicon CMOS sensor is sensitive.

Figure 4:
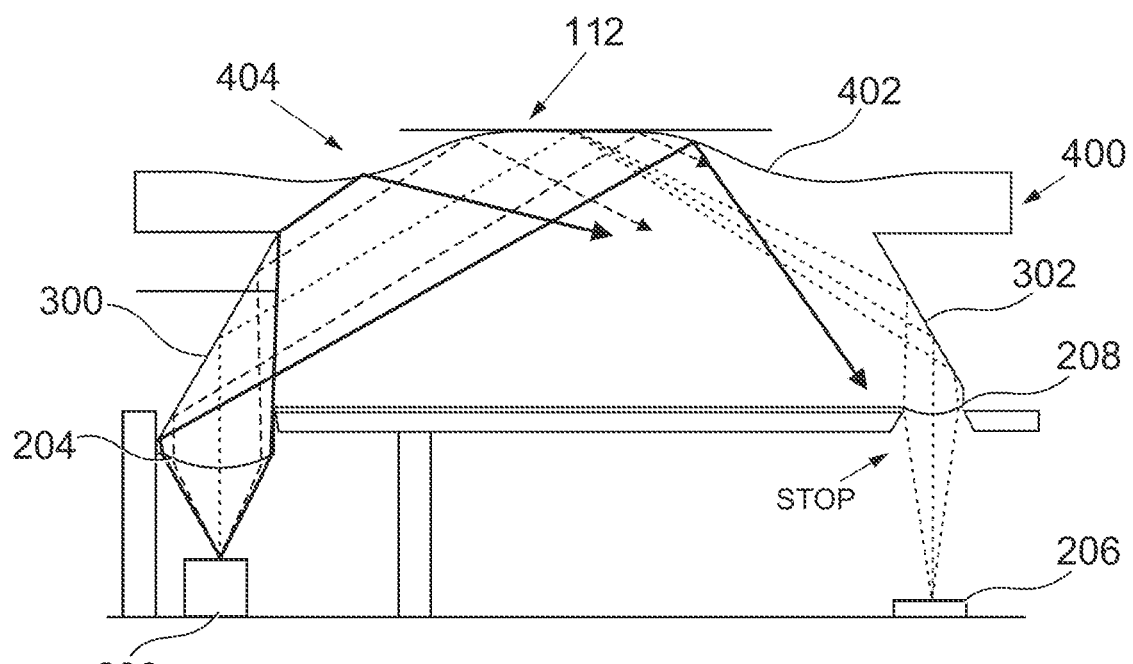
FIG. 4 is an optical diagram of an example of a further embodiment of the FIG. 2 mousing surface, in accordance with an embodiment, given by way of example.
Figure 5:
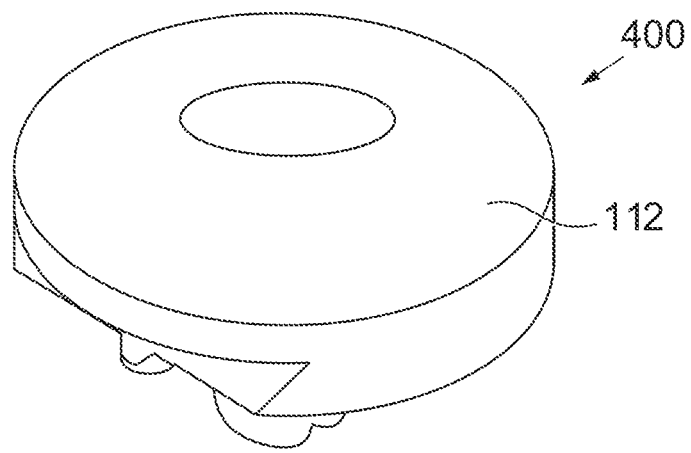
FIG. 5 is an isometric view of the upper surface of the optical navigation device, in accordance with an embodiment, given by way of example.

Referring now to FIG. 4, a further embodiment of an optical navigation device module 400 will now be described. As with the previous embodiment the optical navigation device module includes an LED illumination source 202, a sensor 206; TIR fold surfaces 300 and 302 respectively; optical elements 204 and 208, and a mousing surface 112. The mousing surface is designed in a general undulating cross section. This shape is more clearly illustrated in FIG. 5, which shows an isomeric view of the undulating mousing surface. FIG. 4 shows the undulating surface that includes a gentle protrusion 402, 404 formed at the ideal mousing point on the device. Using this form for the mousing surface ensures that un-used radiation is scattered away from the stop of optical element 208. Use of the undulating surface also provides a point where the pressure between the user's finger, or other pointer, and the mouse is maximized to give best F-TIR contrast ratio, and further provides the user with a point of reference on the mousing surface. The undulation can be used to hide a flat for the mousing surface within a smooth continuous and rising shape, if required.

The undulating surface also lends itself to the use of a visibly clear plastic where the light scattered away from the objective lens aperture can be reflected off the lower surface of the optics to output a visible signal, which may be used to indicate status of a mobile or computer device.

Figure 6:
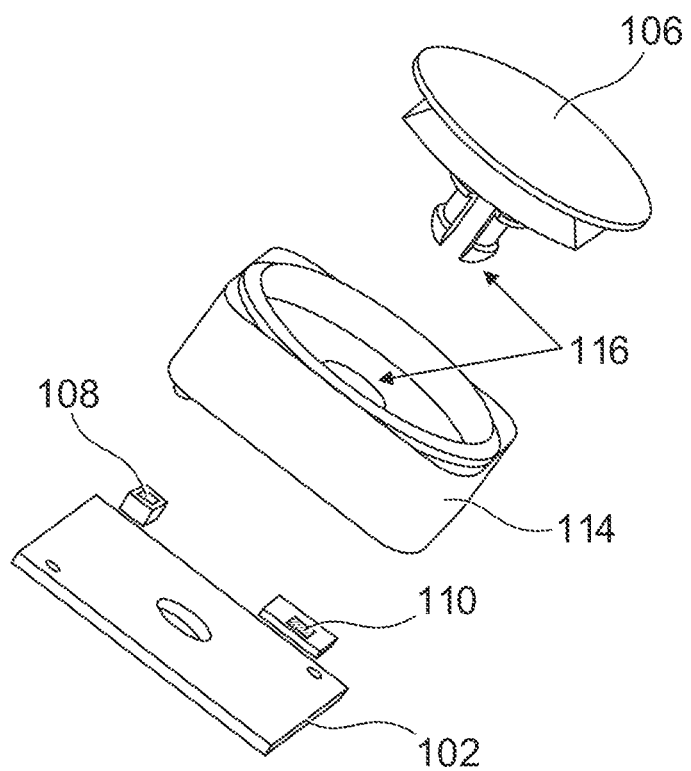
FIG. 6 is exploded view of the optical navigation device, in accordance with an embodiment, given by way of example, FIG. 7_a_ is an example of FIG. 3 showing a different optical element, in accordance with an embodiment, given by way of example, FIG. 7_b_ is a more detailed example of the FIG. 7_a_ optical element, in accordance with an embodiment, given by way of example.

Referring now to FIG. 6, the exploded view of the optical navigation device module demonstrates the available space which is enabled by the particular design of optics and function. FIG. 6 shows the base plate 102, the LED 108, the sensor 110, the PMMA optical element 106 and a housing 114. In addition a space 116 is clearly visible.

The optical navigation device is suitable for use in any device which makes use of a navigation device. For example, the optical navigation device may be used on a mobile computer, phone, a remote controller or any other appropriate device.

Figure 8:
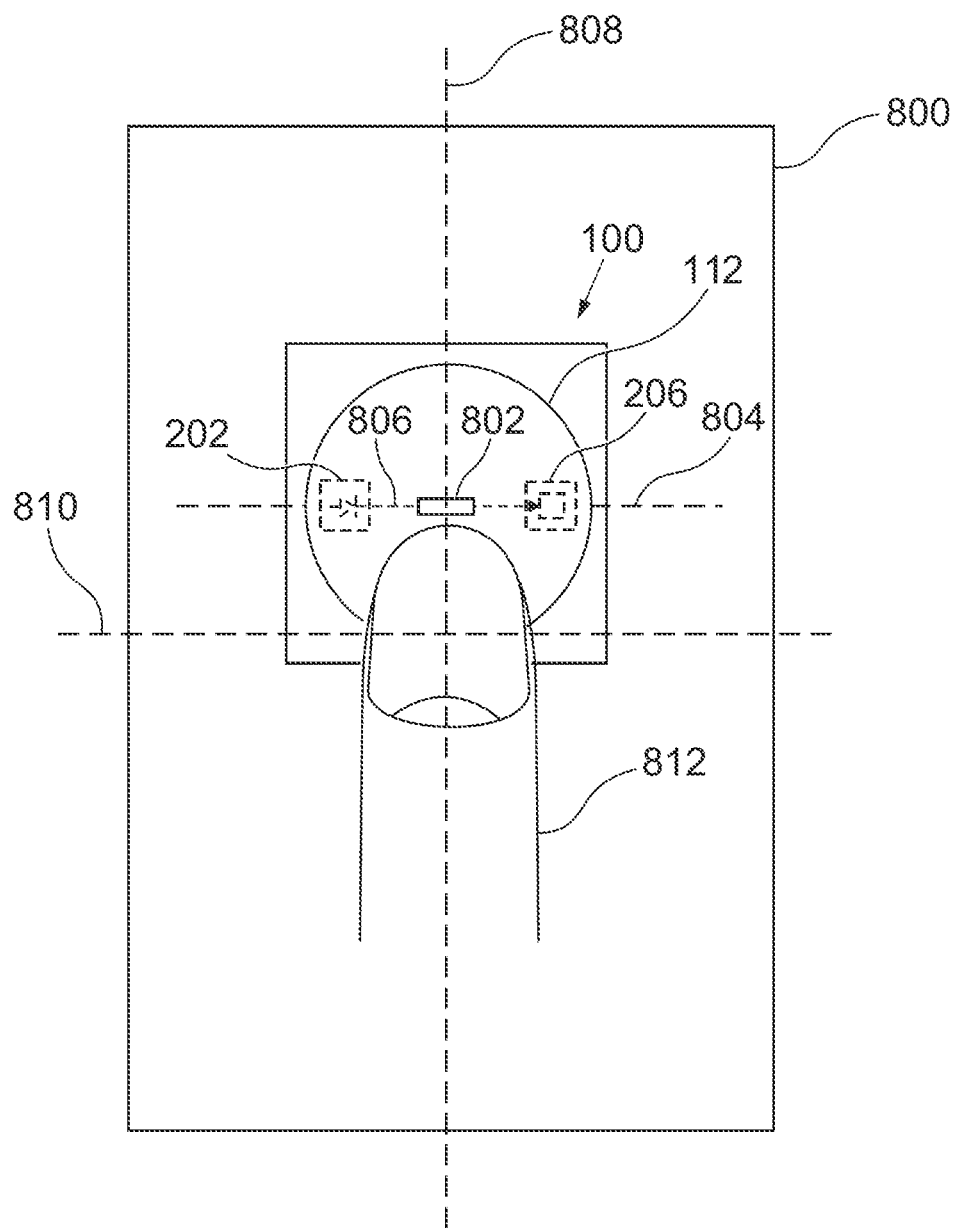
FIG. 8 is an example of the optical navigation device located on a device like a computer device or a mobile phone.

FIG. 8 shows a device 800 from a bird's eye view, which could be for example a computer device or mobile phone, which comprises the optical navigation device module 100. The device 800 is shown in a simplified way. The device 800 could also comprise for example a display or a keypad not shown in FIG. 8. The radiation source 202 and the sensor 206 are on a level below the F-TIR mousing surface 112 of the optical navigation device module 100.

On the mousing surface 112 of the optical navigation device module 100, a rectangular imaged area 802 is shown. The imaged area 802 demonstrates an area stretched in one particular direction in which movements of a feature are detected. The direction in which the imaged area 802 is stretched corresponds with the direction of a longitudinal axis 804 of the imaged area 802. The longitudinal axis 804 of the imaged area 802 is parallel to an axis 806 connecting the radiation source 202 and the sensor 206 and the imaged area 802 is located at the centre of the F-TIR mousing surface 112. The imaged area 802 is stretched in one direction because the F-TIR surface is at an angle to the plane of the sensor 206. This can be explained for example with the reflection of radiation which is sent through a prism formed like a trapezoid. This radiation is reflected from the longer basis side of the prism at a larger area along this basis side than in a direction perpendicular to the basis side in the plane of the basis side. An image on the sensor 206 resulting from movements of a feature on the mousing surface 112 is compressed along the longitudinal axis 804 of the imaged area 802 because the image is focused on the sensor 206, which is for example square shaped. This leads to a lower resolution along the direction in which the imaged area 802 is stretched because a lower number of pixels are detected per imaged period. So the sensitivity of the imaged area 802 is increased along the direction in which it is stretched.

Because of the angle in which the radiation is reflected from the F-TIR surface, astigmatism occurs, i.e. radiation from the sagittal plane does not focus at the same point than radiation from the tangential plane. This leads to the effect that an image is sharp along a first direction but blurred along a second direction when the best focus point is set for a spatial frequency in the first direction, or blurred along the first direction and sharp along the second direction when the best focus point is set for a spatial frequency in the second direction. The effects of the astigmatism can be reduced by focusing the radiation reflected from the mousing surface 112 at the circle of least confusion, i.e. at an intermediate focal length where diagonal spatial frequencies appear clear. As the image on the sensor 206 is compressed along the longitudinal axis 804 (second direction), a better contrast for the corresponding spatial frequencies in the first direction can equilibrate the sensitivity between movement along the first and second direction. This can be obtained by focusing the radiation from the mousing surface 112 between the circle of least confusion and the position where spatial frequencies in the first direction appear sharper.

The longitudinal axis 804 of the imaged area 802 is perpendicular to a longitudinal axis 808 of the device 800 and parallel to an axis 810 perpendicular to the longitudinal axis 808 on the F-TIR mousing surface 112. When the device 800 is operated by a user directly in front of the device 800 and the optical navigation device module 100 is used with a user's finger 812 or a pointer not shown in FIG. 8, it is advantageous when the imaged area 802 is stretched in a direction which corresponds to a sideways or horizontal movement of a user's finger 812 or a pointer instead of a direction which corresponds to an up and down or vertical movement. Since the elasticity of the finger 812 or the pointer is considered to be higher in moving sideways than moving up and down, the delay before the sensor 206 detects an image when the movement on the mousing surface 112 is sideways can be compensated by orientating the stretched image area 802 in the direction in which a sideways movement of a user's finger or pointer is considered to occur during the intended use of the device 800. This is shown in FIG. 8. In case of using a finger, another advantage results from the fact that lines of a fingerprint are nearly horizontal at the top. When the finger 812 is moved sideways, meaning along the nearly horizontal lines on the finger, the chance that these movements are detected is the higher the larger the area in which the movements are detected is. So, when the imaged area 802 is stretched in the direction as shown in FIG. 8, a larger area is provided in the direction of sideways movement of the finger 812.

An angle included by the longitudinal axis 804 of the imaged area 802 and the longitudinal axis 808 of the device 800 does not have to be exactly 90° as shown in FIG. 8. The angle can be in a range between 80° and 100° to provide the above mentioned advantages. Although this aspect has been described as being based on the angle between imaged area axis and axis of phone/computer device 800, it has to be noted that it is mainly the axis of a user's finger 812 when using the device 800 that is critical rather than that of the device 800 in which the module 100 is housed. Furthermore, it has to be noted that the long axis of the relevant device 800 depends on the device, i.e. a camera is usually "landscape" (i.e. wider than taller) but a remote control is usually "portrait" (i.e. taller than wider).

It will be appreciated that this invention may be varied in many different ways and still remain within the intended scope and spirit of the invention.

What is claimed is:

1. An optical navigation device, comprising:
a radiation source capable of producing a beam of radiation;
a sensor for receiving an image; and
an optical element for identifying movement of a feature to thereby enable a control action to be carried out;
wherein the optical element comprises at least one biconic surface for directing radiation from the radiation source to at least one F-TIR surface, wherein the at least one biconic surface and the F-TIR surface are angled with respect to each other;
wherein the optical element comprises at least one additional planar surface for directing radiation from the F-TIR surface to the sensor, wherein the at least one additional planar surface and the F-TIR surface are angled with respect to each other;
wherein the radiation measured at the sensor is radiation which is totally internally reflected at the at least one biconic surface, the F-TIR surface, and the at least one additional planar surface;
wherein an imaged area of the F-TIR surface is stretched along a first direction corresponding to a direction of a longitudinal axis of the imaged area, and the image received on the sensor is compressed along the longitudinal axis; and
wherein radiation from the F-TIR surface is reflected off the at least one additional planar surface and focused on the sensor between a circle of least confusion and a position where spatial frequencies in a second direction appear sharper than spatial frequencies in said first direction.

2. The optical navigation device of claim 1, wherein the optical element is formed from a plastics material.

3. The optical navigation device of claim 2, wherein the optical element is formed from PMMA.

4. The optical navigation device of claim 1, wherein the feature comes in contact with an external surface of the optical element in order to produce the frustrated total internal reflection.

5. The optical navigation device of claim 1, wherein the at least one F-TIR surface has an undulating cross-section.

6. The optical navigation device of claim 5, wherein the undulating cross-section defines a contact region at which the feature can come into contact with the surface of the optical element.

7. The optical navigation device of claim 5, wherein the undulating cross-section defines an indented region which prevents reflection of scattered radiation in the optical element.

8. The optical navigation device of claim 1, wherein the at least one F-TIR surface is a domed shape.

9. The optical navigation device of claim 1, wherein movement of the feature is detected at the sensor in the form of the image.

10. The optical navigation device of claim 9, wherein the movement of the feature is measured at a predetermined rate.

11. The optical navigation device of claim 9, wherein the movement of the feature is translated to cause the control action to occur.

12. The optical navigation device of claim 1, wherein the control action is applied to control a computer device.

13. A device, comprising:
an optical navigation device, comprising:
a radiation source capable of producing a beam of radiation;
a sensor for receiving an image;
an optical element for identifying movement of a feature to thereby enable a control action to be carried out;
wherein the optical element is formed from a single piece construction and includes at least one frustrated total internal reflection (F-TIR) surface capable of causing frustrated total internal reflection of the beam of radiation in the presence of the feature to thereby generate the image which is capable of being translated into said control action;

wherein the optical element comprises at least one biconic surface for directing radiation from the radiation source to the at least one F-TIR surface, wherein the at least one biconic surface and the at least one F-TIR surface are angled with respect to each other;

wherein the optical element comprises at least one folded surface for directing radiation from the at least one F-TIR surface to the sensor, wherein the at least one folded surface and the at least one F-TIR surface are angled with respect to each other; and wherein the radiation measured at the sensor is radiation which is totally internally reflected at the at least one biconic surface, the at least one F-TIR surface and the at least one folded surface.

14. The device of claim 13 wherein the device is one of a mobile telephone or a computer.

15. The device of claim 14, wherein an imaged area on the at least one F-TIR surface is rectangular and stretched in one particular direction, wherein a longitudinal axis of the imaged area includes an angle of 80° to 100 with the longitudinal axis of the computer or the mobile telephone or an axis perpendicular to the longitudinal axis of the computer device or the mobile telephone.

16. The device of claim 15, wherein the longitudinal axis of the imaged area is perpendicular or parallel to the longitudinal axis of the mobile telephone.

17. The device of claim 15, wherein the longitudinal axis of the imaged area is parallel to an axis connecting the radiation source and the sensor.

18. The device of claim 15, wherein the imaged area is located at the center of the at least one F-TIR surface.

19. The device of claim 15, wherein the optical navigation device comprises at least one prism in form of a trapezoid, wherein the imaged area in operation of the optical navigation device is formed on a longer basis side of the at least one prism.

20. The device of claim 15, wherein a focus at which the imaged area is focused between one member of a group comprising a circle of least confusion and a position in which the imaged area is sharper in a direction perpendicular to the horizontal axis of the imaged area.

21. An optical device, comprising:
a first surface adapted to receive an input beam of radiation;
a second surface adapted to output an image;
a third surface to which a feature to be detected is applied;
an optical element having an outer surface defined at least in part by the first, second and third surfaces, the optical element further comprising:

a) a frustrated total internal reflection (F-TIR) surface associated with the third surface;
b) a first internal reflecting surface comprising a biconic surface adapted to reflect the input beam of radiation received at the first surface towards the frustrated total internal reflection (F-TIR) surface; and
c) a second internal reflecting surface comprising a planar or folded surface adapted to reflect the image on frustrated total internal reflection (F-TIR) surface for output at the second surface.

22. The optical device of claim 21, wherein the third surface and associated F-TIR surface have an undulating cross-section.

23. The optical device of claim 22, wherein the undulating cross-section includes a domed feature contact region and an indented region surrounding the domed feature.

24. The optical device of claim 21, wherein the third surface and associated F-TIR surface have a domed shape.

25. The optical device of claim 21 wherein presence of the feature applied to the third surface causes frustrated total internal reflection of the received beam of radiation to thereby generate the image.

26. The optical device of claim 21 wherein the single piece optical element further includes a projection forming a clip for snap-fit connection to a support structure.

27. The optical device of claim 21, wherein an imaged area on the F-TIR surface is rectangular and wherein a longitudinal axis of the rectangular imaged area is parallel to an axis connecting between the first and second surfaces.

28. The optical device of claim 27, wherein the imaged area is located at a center of the F-TIR surface.

29. The optical device of claim 21, wherein the single piece optical element comprises at least one prism in form of a trapezoid, wherein an imaged area in operation of the optical device is formed on a longer basis side of the at least one prism.

30. The optical device of claim 29, wherein a point at which the imaged area is focused is located between a circle of last confusion and a position in which the imaged area is sharper in a direction perpendicular to the horizontal axis of the imaged area.

31. The optical device of claim 21, wherein the optical element further comprises an additional internal reflecting surface adapted to receive the input beam reflected by the fly-eye lens and reflect the input beam toward the F-TIR surface.

32. The optical device of claim 31, wherein the input beam is totally internally reflected by the additional internal reflecting surface.

* * * * *